United States Patent

Shimizu et al.

[11] Patent Number: 5,931,252
[45] Date of Patent: Aug. 3, 1999

[54] AUTOMATIC STEERING SYSTEM FOR VEHICLE

[75] Inventors: Yasuo Shimizu; Katsuhiro Sakai, both of Wako, Japan

[73] Assignee: Honda Giken Kogyo Kabushiki Kaisha, Tokyo, Japan

[21] Appl. No.: 09/055,322

[22] Filed: Apr. 6, 1998

[30] Foreign Application Priority Data

Apr. 7, 1997 [JP] Japan .................................. 9-088400

[51] Int. Cl.$^6$ ...................................................... B62D 1/00
[52] U.S. Cl. ............................ 180/204; 180/446; 701/41
[58] Field of Search ................................... 180/204, 446, 180/167, 168, 169; 701/23, 25, 41

[56] References Cited

U.S. PATENT DOCUMENTS

| 4,735,274 | 4/1988 | Good et al. ............................. 180/204 |
| 4,931,930 | 6/1990 | Shyu et al. ............................. 180/204 |
| 5,742,141 | 4/1998 | Czekaj .................................... 180/204 |
| 5,764,015 | 6/1998 | Shimizu et al. ........................ 318/587 |

FOREIGN PATENT DOCUMENTS

| 61-263851 | 5/1985 | Japan ....................................... 701/41 |
| 3-74256 | 3/1991 | Japan . |
| 4-55168 | 2/1992 | Japan . |

*Primary Examiner*—Kevin Hurley
*Assistant Examiner*—William Zimmerli
*Attorney, Agent, or Firm*—Nikaido, Marmelstein Murray & Oram, LLP

[57] ABSTRACT

An automatic steering system for appropriately maintaining an operational amount of a brake pedal in carrying out automatic parking control, while allowing a vehicle to creep. Data for a steering angle of a wheel relative to a distance of movement of a vehicle is previously stored in a memory section in correspondence to four parking modes. If a desired parking mode is selected by a mode selecting switch and a driver permits the vehicle to creep, while depressing a brake pedal, a control section controls the operation of a steering actuator to carry out automatic parking. A reference operational amount for the brake pedal, is previously set so as to provide an appropriate vehicle creep speed, and if a deviation between an actual operational amount of the brake pedal detected by a brake operational amount detecting means and the reference operational amount exceeds a predetermined value, a warning is emitted by a warning means to the driver, in order to urge the driver to regulate the actual operational amount of the brake pedal.

4 Claims, 2 Drawing Sheets

AUTOMATIC STEERING SYSTEM FOR VEHICLE

BACKGROUND OF THE INVENTION

1. Field of the Invention

The present invention relates to an automatic steering system for a vehicle for automatically parking the vehicle without recourse to steering by the driver.

2. Description of the Prior Art

Automatic steering systems for vehicles are already known from Japanese Patent Application Laid-Open Nos. 3-74256 and 4-55168. These automatic steering systems for vehicles utilize an actuator for the conventionally well-known electric power steering system, and are designed so that the back parking or the linear parking is automatically performed by controlling the actuator based on the previously stored data on the relationship between the distance of movement of the vehicle and the steering angle.

A vehicle equipped with an automatic transmission is automatically parked, while it is traveling utilizing a creep force. Therefore, it is required that a driver depresses the brake pedal during the automatic parking control to regulate the speed of the creep travel. At this time, if the amount that the brake pedal is depressed by the driver is small, there is a possibility that the vehicle creep speed will be too high, resulting in a possibility that the response of the actuator for the electric power steering system is not in time, whereby the vehicle does not move along the predetermined locus. If the amount the brake pedal is depressed by the driver is too large, there is a possibility that the vehicle creep speed is too low, whereby the time required for the automatic parking is prolonged.

SUMMARY OF THE INVENTION

The present invention has been accomplished with the above circumstance in view, and it is an object of the present invention to appropriately maintain the amount of operation of the brake input means in carrying out the automatic parking control while allowing the vehicle to creep.

To achieve the above object, according to the present invention, there is provided an automatic steering system for a vehicle, comprising a movement locus setting means for storing or calculating a locus of movement of the vehicle to a target position, an actuator adapted to steer a vehicle wheel based on the locus of movement set by the movement locus setting means, a brake input means operated by the driver to brake the vehicle, and an actuator driving control means adapted to drive the actuator when the brake input means is operated. The automatic steering system further includes a brake operational amount detecting means for detecting an actual operational amount of the brake input means, and a deviation calculating means for calculating the deviation between the detected actual operational amount and a preset reference operational amount.

With the above arrangement, the vehicle creep speed can be appropriately maintained to reliably carry out the automatic parking control, by recognizing the deviation between the actual operational amount of the brake input means and the preset reference operational amount. The reference operational amount is defined as the amount of operation of the brake input means, at which a vehicle creep speed (3 km/hr to 10 km/hr in a preferred embodiment) which is suitable for carrying out the automatic parking control, is obtained, and the particular value of the reference operational amount can be properly selected depending on the design.

According to the present invention, in addition to the above feature, the automatic steering system further includes a notifying means for notifying the driver of at least one of the actual operational amount, the reference operational amount and the deviation.

According to another aspect of the present invention, the automatic steering system further includes a warning means for providing a warning when the deviation is equal to or larger than a predetermined value. The driver can thus be reliably informed to increase or decrease the operational amount of the brake input means. The predetermined value is defined as a deviation resulting from the fact that the vehicle creep speed is too large or too small to the extent of impeding the automatic parking control. In the preferred embodiment, the predetermined value is set at a value corresponding to a vehicle creep speed of 1 km/hr, but a particular value of the predetermined value can be properly selected depending on the design.

BRIEF DESCRIPTION OF THE DRAWINGS

The mode for carrying out the present invention will now be described by way of an embodiment shown in the accompanying drawings.

DETAILED DESCRIPTION OF THE PREFERRED EMBODIMENT

Figure 1:
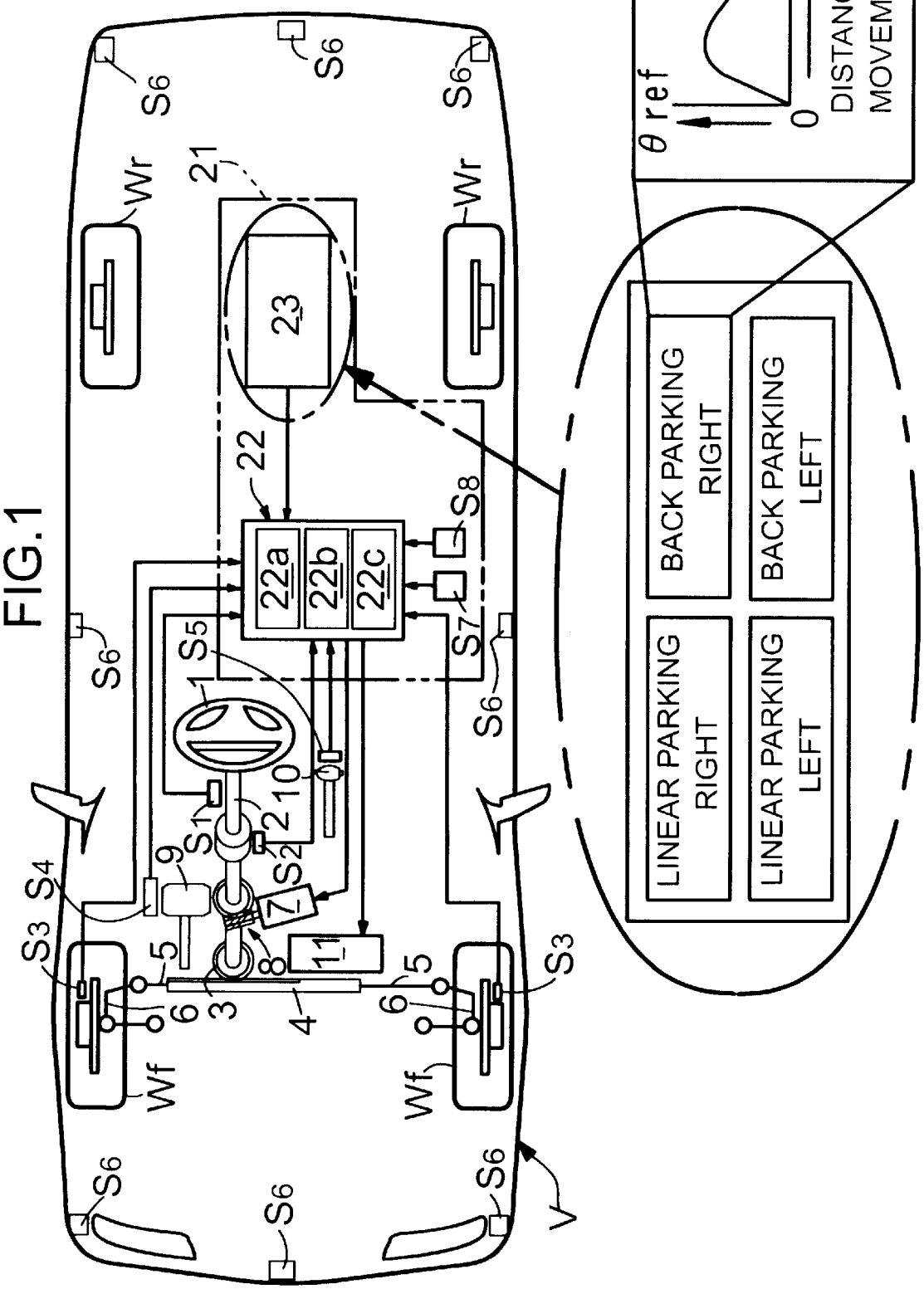
FIG. 1 is an illustration of a vehicle equipped with a steering control system according to an embodiment of the present invention.

As shown in FIG. 1, a vehicle V includes a pair of front wheels Wf, Wf and a pair of rear wheels Wr, Wr. A steering wheel 1 and the front wheels Wf, Wf which are the steered wheels, are interconnected by a steering shaft 2 rotated in unison with the steering wheel 1, a pinion 3 provided at a lower end of the steering shaft 2, a rack 4 meshed with the pinion 3, left and right tie rods 5, 5 provided at opposite ends of the rack 4, and left and right knuckles 6, 6 connected to the tie rods 5, 5. A steering actuator 7 having an electric motor, is connected to the steering shaft 2 through a worm gear mechanism 8, in order to assist in the operation of the steering wheel 1 by a driver, or to conduct automatic steering for garaging of the vehicle (which will be described hereinafter).

A steering control unit 21 comprises a control section 22 and a memory section 23. Input to the control section 22 are signals from a steering angle detecting means $S_1$ for detecting the steering angle θ of the front wheels Wf, Wf based on the rotational angle of the steering wheel 1; a steering torque detecting means S2 for detecting the steering torque of the steering wheel 1; front wheel rotational angle detecting means $S_3$, $S_3$ for detecting the rotational angles of the left and right front wheels Wf, Wf; a brake operational amount detecting means $S_4$ for detecting the operational amount of a brake pedal 9 as a brake input means; a shift position detecting means $S_5$ for detecting the shift position selected by a select lever 10 (a "D" position, an "R" position, an "N" position, a "P" position or the like); and eight object detecting means $S_6$ mounted at a front portion, a central portion and a rear portion of the vehicle V. The object detecting means $S_6$ may be any known type detectors such as sonar, radar, television camera or the like. Lines connecting the eight object detecting means $S_6$ and the control section 22 are omitted from the drawing for the purpose of preventing the complication of the drawings. The memory section 23 functions as a movement locus setting means of the present invention.

Further, a mode selecting switch $S_7$ and an automatic parking start switch $S_8$ operated by the driver, are connected to the control section 22. The mode selecting switch $S_7$ is operated to select any of four parking modes described hereinafter: a back parking/right mode, a back parking/left mode, a linear parking/right mode, and a linear parking/left mode. The automatic parking start switch S8 is operated to start automatic parking in any mode selected by the mode selecting switch $S_7$.

Data for the four parking modes, i.e., relationships of reference steering angles θref to distances of movement X of the vehicle V are previously stored as a table in the memory section 23. The distance of movement X of the vehicle V is calculated by multiplying the known peripheral length of the front wheel Wf by a rotational angle of the front wheel Wf detected by the front wheel rotational-angle detecting means $S_3$, $S_3$. Either one of a high-select value and a low-select value outputted from the pair of left and right front wheel rotational-angle detecting means $S_3$, $S_3$, and an average value of the high-select value and the low-select value is used for the calculation of the distance of movement X.

The control section 22 includes a deviation calculating means 22a, an actuator-driving control means 22b and an operational stage display-device control means 22c, and controls the operation of the steering actuator 7 and the operation of an operational stage display device 11, including a liquid crystal monitor, a speaker, a lamp, a chime, a buzzer or the like, based upon the signals from the detecting means $S_1$ to $S_6$ and the switches $S_7$ and $S_8$, and the data for the parking modes stored in the memory section 23. The operational stage display device 11 functions as a notifying means and a warning means of the present invention.

The operation of the embodiment of the present invention having the above-described arrangement will be described below.

When the vehicle is in a usual state in which the automatic parking is not carried out (when the automatic parking start switch $S_8$ is not in an ON state), the steering control unit 21 functions as a regular power-steering control unit. More specifically, when the steering wheel 1 is operated by the driver to turn the vehicle V, the steering torque detecting means $S_2$ detects a steering torque input to the steering wheel 1, and the actuator-driving control means 22b controls the driving of the steering actuator 7 based on the steering torque. As a result, the left and right front wheels Wf, Wf are steered by the driving force from the steering actuator 7, whereby the steering operation provided by the driver, is assisted.

The operation of an automatic parking control will be described using the back parking/left mode (the mode in which the parking is conducted while the vehicle is being moved backwards to a parking position lying on the left side of the vehicle V) as an example.

Figure 2A:
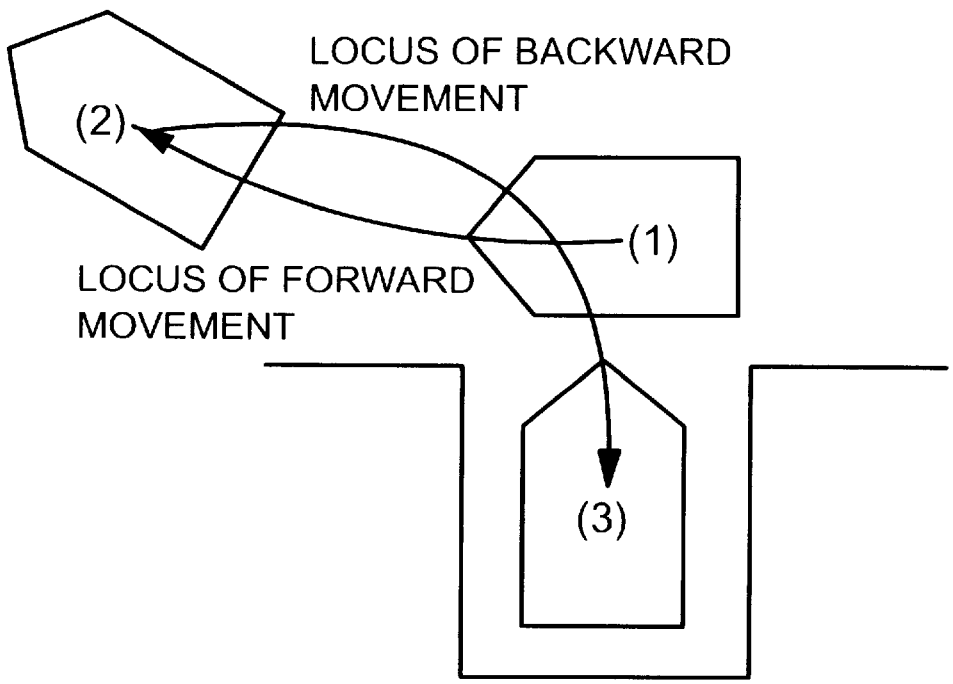
FIGS. 2A and 2B are illustrations for explaining the operation according to an embodiment of the present invention in a back parking/left mode.

First, as shown in FIG. 2A, the vehicle V is moved close to a garage where the vehicle V is to be parked, and in a state in which the left side of the vehicle body is located as close as possible to an inlet line of the garage. The vehicle V is stopped at a position (a start position (1)) at which a predetermined reference point (e.g., a left sideview mirror) is matched with a center line of the garage. When the mode selecting switch $S_7$ is operated to select the back parking/left mode and the automatic parking start switch $S_8$ is turned ON, the automatic parking control is started. While the automatic parking control is being conducted, the current position of the subject vehicle, the surrounding obstacles, the parking position, a presumed locus of movement of the subject vehicle from the start position to the parking position, the turn-back position for switch-over from forward movement to backward movement and the like are all indicated on the operational stage display device 11, controlled by the operational stage display device control means 22c, and in addition to this, various instructions and warnings for the operation of the select lever 10 at the turn-back position are emitted by voice from the speaker to the driver.

By loosening the brake pedal 9, the driver can perform creeping of the vehicle V, and the front wheels Wf, Wf are automatically steered based on the data for the back parking/left mode selected by the mode selecting switch $S_7$ due to the automatic parking control, even if the steering wheel 1 is not operated. More specifically, while the vehicle V is being moved forwards from the start position (1) to the turn-back position (2), the front wheels Wf, Wf are automatically steered to the right. While the vehicle V is being moved backwards from the turn-back position (2) to the parking-end position (3), the front wheels Wf, Wf are automatically steered to the left.

Figure 2B:
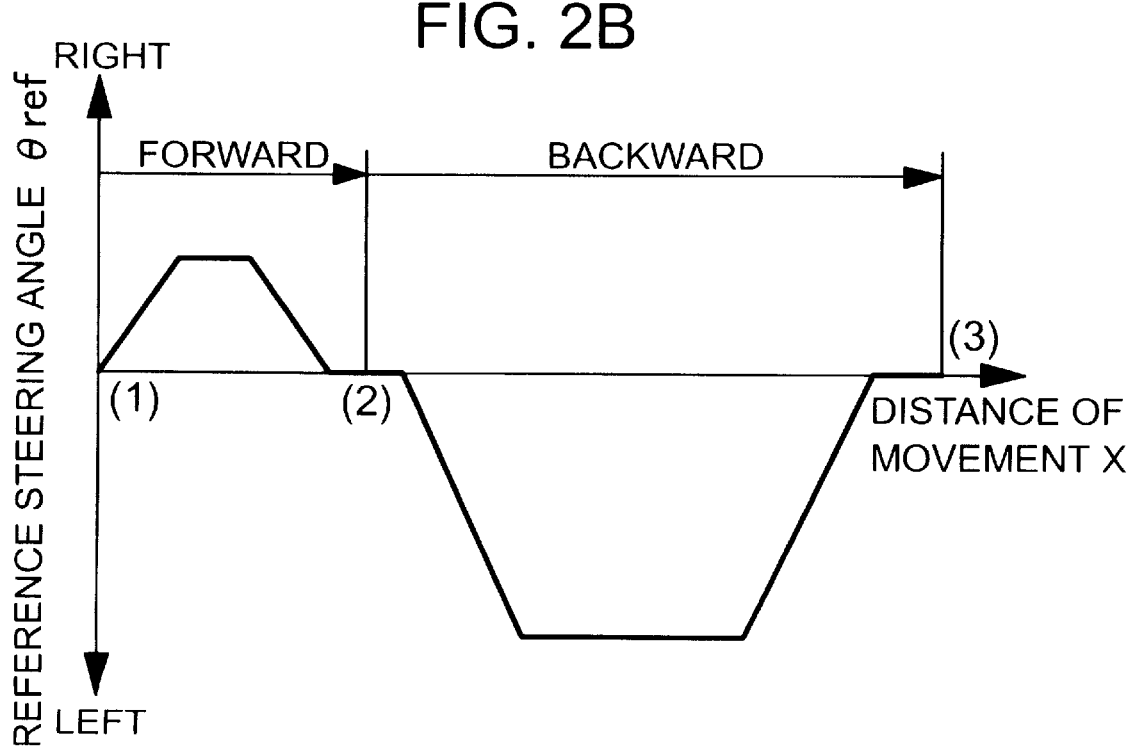

As can be seen from FIG. 2B, while the automatic steering is being carried out, the actuator-driving control means 22b calculates a deviation $E_1 = θref - θ$ based on a reference steering angle θref in the back parking/left mode read out from the memory section 23 and the steering angle θ input from the steering angle detecting means $S_1$, and controls the operation of the steering actuator 7, so that the deviation $E_1$ is equal to 0. At this time, the reference steering angle θref is set in correspondence to the distance of movement X of the vehicle V and hence, even if there is a variation in vehicle speed during creeping travel, the vehicle V is always moved on the locus of movement.

The automatic parking control is carried out, while the driver is depressing the brake pedal 9 to conduct creeping. If the amount the brake pedal 9 is depressed by the driver is small, the vehicle creep speed may be too high, causing the response of the steering actuator 7 to be retarded, whereby the vehicle is not moved on the predetermined locus. On the other hand, if the amount the brake pedal 9 is depressed by the driver is large, the vehicle creep speed may be too low, causing the time required for the automatic parking to be prolonged.

Therefore, the deviation calculating means 22a of the control section 22 calculates a deviation $E_2$ between the actual operational amount of the brake pedal 9 detected by the brake pedal operational-amount detecting means $S_4$ and the preset reference operational amount of the brake pedal 9. The reference operational amount is set as an operational amount of the brake pedal 9 at which an appropriate vehicle creep speed (e.g., 3 km/hr to 10 km/hr) is obtained in carrying out the automatic parking control.

The deviation $E_2$ is input from the deviation calculating means 22a to the operational stage display-device control means 22c, and the operational stage display-device control means 22c controls the operational stage display device 11 to provide information, instructions, a warning and the like to the driver, regarding to the operational amount of the brake pedal 9. More specifically, the driver can recognize the excess or the shortage of the actual operational amount of the brake pedal 9 as a result of the notifying of the driver of the actual operational amount of the brake pedal 9, the reference operational amount of the brake pedal 9 and/or the deviation $E_2$ between the actual operational amount and the reference operational amount using the liquid crystal monitor, the speaker, the lamp, the chime, the buzzer or the like of the display device 11. In this case, if the number of the lamps lighted or the magnitude of the voice is changed depending upon the values of the actual operational amount, the reference operational amount and/or the deviation $E_2$, it is possible for the driver to reliably recognize these values.

If the deviation $E_2$ exceeds a predetermined value, the driver is advised to regulate the actual operational amount of the brake pedal 9 by the operational stage display device 11 emitting a warning to the driver by means of the liquid crystal monitor, the speaker, the lamp, the chime, the buzzer or the like. Thus, the vehicle creep speed is prevented from becoming too high or too low, thereby enabling the appropriate automatic parking control. The predetermined value is set, for example, at 1 km/hr. In this case, if the vehicle creep speed becomes 11 km/hr beyond 10 km/hr which is an upper limit for the reference operational amount, the warning is emitted. If the vehicle creep speed becomes 2 km/hr lower than 3 km/hr which is a lower limit for the reference operational amount, the warning is emitted. The case where the vehicle creep speed is lower than the lower limit, occurs when the vehicle is traveling at an extremely low speed, e.g., when the vehicle is being moved extremely slowly in the garage, while the driver is paying a sufficient attention to the surroundings. Therefore, in such case, the warning need not necessarily be emitted.

The above-described automatic parking control is canceled when the driver has turned OFF the mode selecting switch $S_7$. In addition, when the driver releases his foot from the brake pedal 9, when the driver operates the steering wheel 1, or when any of the object detecting means $S_6$ detects an obstacle, the automatic parking control is canceled, returning to the normal power-steering control.

In the above-described embodiment, the locus of movement of the vehicle V to the target position has been previously stored in the memory section 23, but the locus of movement can be calculated from the current position and the target position of the vehicle V. Further, in place of emitting the notification or the warning to the driver using the operational stage display device 11, the brake pedal 9 or the seat may be vibrated, or a meter type indicator may be oscillated.

As discussed above, the deviation between the actual operational amount detected by the brake operational amount detecting means and the preset reference operational amount is calculated by the deviation calculating means. Therefore, the creep speed of the vehicle can be properly maintained to reliably carry out the automatic parking control by using the deviation to operate the brake operational amount detecting means.

Also, the automatic steering system includes the notifying means for notifying the driver of at least one of the actual operational amount, the reference operational amount and the deviation, whereby the driver can be reliably notified of the values thereof.

Further, the automatic steering system includes the warning means adapted to emit a warning when the deviation is equal to or more than a predetermined value, whereby the driver can be reliably advised to increase or decrease the operational amount of the brake input means.

Although the embodiment of the present invention has been described in detail, it will be understood that various modifications may be made without departing from the subject matter of the present invention.

We claim:

1. An automatic steering system for a vehicle, comprising:

a movement locus setting means for storing a locus of movement of a vehicle to a target position, an actuator adapted to steer at least one wheel of the vehicle wheel based upon the locus of movement set by said movement locus setting means, a brake input means operated by a driver to brake the vehicle, an actuator driving control means coupled to said actuator for operating said actuator when said brake input means is operated, a brake operational amount detecting means for detecting an actual operational amount of said brake input means, and a deviation calculating means, coupled to said brake operational amount detecting means, for calculating a deviation between the detected actual operational amount and a preset reference operational amount of said brake input means.

2. An automatic steering system for a vehicle, comprising:

a movement locus setting means for calculating a locus of movement of a vehicle to a target position, an actuator adapted to steer a wheel of the vehicle based upon the locus of movement set by said movement locus setting means, a brake input means operated by a driver to brake the vehicle, an actuator driving control means coupled to said actuator for operating said actuator when said brake input means is operated, a brake operational amount detecting means for detecting an actual operational amount of said brake input means, and a deviation calculating means, coupled to said brake operational amount detecting means, for calculating a deviation between the detected actual operational amount and a preset reference operational amount of said brake input means.

3. An automatic steering system for a vehicle according to claim 1 or 2, further including a notifying means for indicating at least one of said actual operational amount, said reference operational amount and said deviation.

4. An automatic steering system for a vehicle according to claim 1 or 2, further including a warning means for emitting a warning when said deviation is equal to or greater than a predetermined value.

* * * * *